United States Patent [19]

Nagai et al.

[11] Patent Number: 4,756,956

[45] Date of Patent: Jul. 12, 1988

[54] FOAMED CERAMIC PANEL AND METHOD OF PRODUCING THE SAME

[75] Inventors: Satoru Nagai, Toki; Kazuo Imahashi, Chofu; Yoshio Nagaya, Toki; Shigeo Yoshida, Shiga; Satoshi Kitagawa, Shiga; Takatoshi Miyazawa, Shiga, all of Japan

[73] Assignees: National House Industrial Co., Ltd., Toyonaka; Takasago Industry Co., Ltd., Toki; Intelhearts Co., Ltd., Tokyo, all of Japan

[21] Appl. No.: 103,864

[22] Filed: Oct. 2, 1987

[51] Int. Cl.[4] .................. B32B 3/26; B32B 18/00
[52] U.S. Cl. .................. 428/312.2; 156/89; 264/43; 428/312.8; 428/319.1
[58] Field of Search .......... 156/89; 264/42, 43, 264/44; 428/312.2, 312.6, 312.8, 319.1

[56] References Cited

U.S. PATENT DOCUMENTS

| | | | |
|---|---|---|---|
| 3,991,254 | 11/1976 | Takeuchi | 428/312.8 |
| 4,184,885 | 1/1980 | Pasco et al. | 428/312.8 |
| 4,693,918 | 9/1987 | Fujimoto et al. | 428/319.1 |

FOREIGN PATENT DOCUMENTS

| | | | |
|---|---|---|---|
| 59-22398 | 2/1984 | Japan | 428/312.8 |
| 59-162168 | 9/1984 | Japan | 428/312.8 |

*Primary Examiner*—William J. Van Balen
*Attorney, Agent, or Firm*—Armstrong, Nikaido, Marmelstein & Kubovcik

[57] ABSTRACT

A foamed ceramic panel having a base layer comprising foamed inorganic raw materials and a fine glass layer comprising fused and solidified ceramic paper and formed on at least one surface of the base layer. A layer of heat-foamable inorganic raw materials and the ceramic paper laminated on the surface of the layer of heat-foamable inorganic raw materials are simultaneously burned and fused together. In producing the panel, the glossiness of the surface of the panel is improved by quenching the foamed panel and re-heating the same to a softening temperature. The panels are applicable to interior or exterior materials for various kinds of buildings, art ceramic panels for decoration, and the like.

9 Claims, No Drawings

FOAMED CERAMIC PANEL AND METHOD OF PRODUCING THE SAME

BACKGROUND OF THE INVENTION

The present invention relates to a foamed ceramic panel which is light, capable of being made in a large size, ornamental or decorative, superior in fireproofness, refractoriness, and corrosion-resistance; and to a method of producing the same.

Hitherto, a panel made of inorganic raw materials such as tile and roof tile is produced by shaping raw materials, drying the shaped body, glazing a surface of the shaped body, and burning it to vitrify the surface thereof, so that the surface water absorption of the panel is prevented and a fine spectacle thereof is presented.

In the case of a foamed ceramic panel, however, a base layer comprising foamable raw materials and a glaze layer cannot be burned at the same time, because the base layer has much larger expansion coefficient than tha glaze layer and therefore cracks are generated in the glaze layer. On the other hand, when the base layer is glazed after being burned, there are caused several problems that many manufacturing processes are required; when reinforcing bars are embedded in the base layer, the reinforcing bars are deteriorated; and cracks are generated in the base layer because thermal stress is generated therein due to a large temperature difference between a surface portion of the base layer and a core or inner portion thereof on burning the glaze layer. Further, pinholes are likely to arise because the surface of the foamed ceramic panel is porous. The surface is microscopically rough like a surface of an orange due to traces or marks of foamed particles, though the surface might be expressed to be macroscopically smooth. Thus, there cannot be obtained a smooth surface like a glass surface.

Further, the surface strength of the foamed ceramic panel is low since the panel is only coated with a thin film-like coating formed by a foaming.

Still further, when pattern is formed on or given to a surface of the foamed ceramic panel, the pattern is transferred to the surface of the panel using, for example, a printing paper made by a copper plate. This printing paper is made by coating paste-containing ink on an etched copper plate (a kind of mold), laminating a paper thereon, drying the paper, and peeling off the same. A pattern is transferred to the panel by getting the paper colored with coloring materials wet with water, putting the papter onto the panel, and peeling off the paper. Then the panel is burned to obtain a pattern. In this method using printing papers, however, the manufacturing process becomes complicated. Further, the productivity is poor and the quality of obtained pattern is not stable. Concretely speaking, on peeling off the paper, the transferred pattern is likely to go out of order, so that the quality of pattern is not stable. The pattern also goes out of order by the foaming of the base layer.

Accordingly, there is no other way to decorate a foamed ceramic panel than putting a relief pattern on the panel or coloring the whole panel. So, in the conventional method, neither desirable fine multicolor pattern nor distinct pattern (such a pattern that can be seen clearly, sharply or distinctly) has been able to be obtained.

The present invention was made to solve the above-mentioned problems, and it is an object of the present invention to provide a foamed ceramic panel and a method of producing the same wherein a fine glass-like ceramic layer is integrated with a foamed layer using a ceramic layer in order to improve the surface smoothness, decoration, surface strength and the like which have been thought to be drawbacks inherent in the foamed ceramic panel, while making the best use of distinguished features of the foamed ceramic panel, i.e. lightness, heat-insulation, refractoriness, workability, water or moisture proofness, and capability of being made in a large size.

SUMMARY OF THE INVENTION

In accordance with the present invention, there is provided a foamed ceramic panel having a base layer comprising foamed inorganic raw materials and a fine glass layer comprising fused and solidified ceramic paper, wherein a fine glass layer is formed on the surface of the foamed ceramic panel by simultaneously burning a layer comprising heat-foamable inorganic raw materials and the ceramic paper laminated on at least one surface of the layer comprising heat-foamable inorganic raw materials to fuse and integrate with each other. Further, in accordance with the present invention, there is also provided a method of producng a foamed ceramic panel comprising laminating ceramic paper on at least one surface of a base layer comprising heat-foamable inorganic raw materials, simultaneously burning the base layer and ceramic paper to fuse and integrate with each other, quenching both surfaces of an obtained foamed panel with at least one cooled pressing roll just after the fusing, and raising a temperature of a surface of the foamed panel to a softening temperature.

The foamed ceramic panel of the present invention has superior surface smoothness and improved surface strength. The panel is further improved in decoration, since desirably colored or printed ceramic papers are used for decorating the panel whereby a wide variety of patterns which are surprisingly distinct or clear can be applied on a surface of the foamed ceramic panel.

DETAILED DESCRIPTION

A foamed ceramic panel of the present invention is obtainable by the following steps. Firstly, a ceramic paper obtained by paper-making, for example, a mixed slurry comprising almina fibers, mullite fibers (such fibers of which main crystal is $3Al_2O_3.2SiO_2$ and having superior mechanical strength, heat-resistance, and corrosion-resistance), and inorganic powder is laminated on a base layer comprising foamable inorganic raw materials. The base layer and ceramic paper are heated and fused, whereby a foamed layer made of foamable inorganic raw materials and a fine surface layer made of ceramic paper are integrated with each other.

Foamable inorganic raw materials are, for instance, prepared by adding foaming agents such as dolomite and silicon carbide to powders such as natural glass and artificial glass. It is preferable, however, to use pellets of 0.2 to 1 mm in diameter prepared by adding flux components and foaming agents to volcanic natural raw materials such as acid clay, Kokaseki (a kind of pumice from Niijima in Japan) and Sirasu (a kind of pumice from Kagoshima pref. in Japan; volcanic sand or ash, and their loose agglomerate) instead of glass powder, griding the obtained mixture to such an extent that 90% by weight of grinded material pass through a sieve of 44 $\mu$m mesh, and pelletizing the powder, from a viewpoint of uniform temperature distribution and effective diffusion of gas generated by the foaming.

Flux components lower the melting point of materials whereto the flux components are added. Examples of such flux components include, for instance, $Na_2Co_3$, $Na_2SiO_3$, $NaNo_3$, $Na_2HPO_4$, $Pb_3O_4$, $2PbCo_3.Pb(OH)_2$, $BaCO_3$, $NaB_4O_7.10H_2O$, $H_3BO_3$, $ZnO$, glass powder, and frit.

The ceramic paper is a sheet-like material obtained by paper-making a slurry comprising inorganic powdery raw materias such as feldspar, glass powder, and frit; inorganic fibers; organic binders; inorganic binders; flocculants; and the like. Examples of the preferable mixture are, for instance, a mixture of inorganic powdery raw materials and at least one of almina fibers and mullite fibers; a mixture of inorganic powdery raw materials, inorganic fibers, and pulp fibers; a mixture of inorganic powdery raw materials and pulp fibers; and the like. Thus, inorganic powdery raw materials and fiber raw materials are essential components to the ceramic paper. In particular, it is preferable to use at least one of almina fibers and mullite fibers since they can restrain the shrinkage of ceramic papers during a burning step. The use of preliminarily burned raw materials further restrains the shrinkage.

It is somehow possible to use glass fibers, pulp fibers, and the like for fiber raw materials. They cause no problem in the production of sheets. However, there is caused a problem that many ceramic-paper-less portions (such portions that are not coated with ceramic paper and therefore have no fine surface layer) appear or present on the outskirts of the foamed ceramic panel, because the abvoe glass fibers and pulp fibers shrink by the heat while the base layer is foamed and expanded. Accordingly, it is preferable that raw materials of the ceramic paper contain 4 to 8% by weight of inorganic fibers such as almina fibers and mullite fibers.

The ceramic paper is produced by paper-making a slurry having the above-mentioned blending to obtain a sheet-like material. A continuous paper-making machine is employable in the paper-making step. A desirable pattern such as emboss pattern can be given to the ceramic paper by, for example, stamping or embossing the ceramic paper produced by paper-making machines, or printing the dried ceramic paper be means of suitable printing machines. In the case of employing a printing method, desirable colors can be given to the ceramic panel besides distinct or clear patterns which have not been impossible to realize by the conventional method.

In addition, colored sheet (colored ceramic paper) can be obtained by adding coloring agents such as metal oxide of Cr, Mn, Co, Ni, Cu, and the like, and pigments. Metal oxide fuses into glass phase and foams during a burning step. In that case, coloring elements fuse into glass phase and foams in the state of ions. On the other hand, pigments do not fuse into the glass phase like metal oxide, and are suspended in the glass phase. The pigments are prepared by mixing the above metal oxide and kaoline, feldspar and the like, preliminarily burning the mixture, washing the burned mixture, and grinding the washed mixture. Pigments used in the present invention are required to be stable to flux components.

Next, there is explained a metod of producing a foamed ceramic panel of the present invention.

The foamed ceramic panel is produced by forming a base layer comprising pellet-like foamable inorganic raw materials described above, laminating a ceramic paper on the surface of the base layer, and burning them to integrate the base layer and ceramic paper together. The foamed ceramic panel is also produced by forming a base layer on a ceramic paper, laminating another ceramic paper on the surface of the base layer, and burning them to integrate the base layer and ceramic papers together. As a kiln, it is preferable to employ a carrying tunnel kiln provided with a heat-resistant mesh belt therein. In the case of using a mesh belt, volatile components generated in a foaming step can be uniformly diffused from the upper and lower surfaces of the belt and uniform heat transfer can be carried out at both upper and lower surfaces of the panel.

The burning temperature is determined according to the proportion of $SiO_2$, $Al_2O_3$, and flux components in the blended raw materials. When metal parts are used for mesh belt, rolls, and the like, it is preferable to burn the raw materials at a lowest temperature. Concretly speaking, the burning is preferably carried out within the temperature range of 750° C. to 850° C.

Though the fusing temperature of the ceramic paper can be suitably varied depending on the blending of raw materials, it is preferably so adjusted that the ceramic paper fuses at a temperature lower than the burning temperature of the base materials, because the burning temperature of the base materials is more important factor than the fusing temperature of the ceramic paper from a viewpoint of performance of products and therefore should be determined with priority.

When the temperature of the base layer and ceramic papers is raised in the kiln, the base layer and ceramic papers begin to soften. At the same time, the base layer expands with gas generation and increases in its volume. Thus, the foaming of the base layer proceeds. In that case, the ceramic paper laminated on at least one surface of the base layer softens, fuses and become integrated with the foamed base layer.

After the foaming is carried out, the foamed ceramic panel comprising a base layer and ceramic paper which are integrated each other is cooled. In that case, the surface of the foamed ceramic panel is preferably quenched by at least one roll and thereafter is re-heated so as to re-soften. The preferable number of rolls varies depending on the thickness, kind of raw materials of the panel, and is not limited in the present invention. The re-heating can be carried out in, for example, the atmosphere temperature in the kiln.

The brightness of color or glossiness (which can be measured based on JIS Z 8722) can be improved by the re-softening of the foamed ceramic panel after the quenching. The reason why the panel is re-heated after being pressed and quenched by the roll is that, even glossy glass-like surface fused by the heat loses its glossiness if pressed by the hot roll and becomes a mat surface. So, the panel is moved to a cooling zone after the surface thereof is re-heated and fused to present glossiness, and gradually cooled to remove the strain stress generated in the panel by the quenching, so that the fine layer made of ceramic paper and foamed base layer are integrated with each other. Thus, there can be produced smooth and glossy foamed ceramic panels.

With respect to the temperature of the quenching and pressing roll, the adhesion of fused ceramic paper to the surface of the roll can be prevented by pressing the surface of the foamed ceramic panel with rolls of which temperature is 60° to 70° C. lower than the surface temperature of the foamed ceramic panel. It is preferable, however, that the temperature of rolls is lowered to a solidifying temperature of the panel in order to improve the productivity stress. That is, it is a general and preferable method wherein the surface of the foamed ceramic panel of which surface temperature is, for example, 880° C. is quenched to a temperature of 600° C. and then is re-heated to about 850° C.

Next, a foamed ceramic panel and a method of producing the same of the present invention are explained based on the following Examples and Comparative Examples. It should be noted, however, that the present invention is not limited thereto.

EXAMPLE 1

A mixture consisting of 69% of feldspar (% by weight, hereinafter the same), 17% of soda ash, 10% of $ZrSiO_4$, and 4% of soda nitrate was wet-grinded using a pot mill to obtain slips all of which pass through a sieve of 250 μm mesh. 5% of almina fibers (% is based on the total weight of the above blended raw materials), 5% of starch, 2% of acrylic emulsion, and anion or cation as a flocculant were added to the obtained slips. The liquid material was so prepared therefrom that the pulp concentration (a concentration of raw materials paper-made by a paper-making machine) was not more than 1%. The liquid material was fed to a paper-making machine to produce a sheet of 50 $cm$ × 50 $cm$ × 0.1 $cm$.

The finish was made on the surface of the obtained sheet by a roll at a pressure of 20 kg/cm². Then, the sheet was dried by FIR (Far Infrared Radiation) for two hours. After the drying, six kinds of pigments each of which was mixed with 201 cerazol (oil for kneading pigments which is available from Mitamura Shoten Kabushiki Kaisha) and adjusted to fuse at 850° C. were directly printed on the ceramic paper respectively with a squeegee using six screens each of which corresponds to one kind of pigment. The patterned ceramic paper was obtained by drying the printed ceramic paper. The blending of the ceramic paper was so adjusted that the paper fuses at 850° C.

Next, a mixture consisting of 71% of acid clay, 10% of soda ash, 4% of soda nitrate, 10% of zircon flower (powder-like material prepared by grinding zircon sand to such a degree that the grain size is not more than 74 μm), and 5% of dolomite was dry-grinded by a pot mill to produce grinded material having a grain size of 44 μm/90% (not less than 90% by weight of grinded material pass through a sieve of 44 μm mesh). Thereafter, pellets having a grain diameter of 1 to 2 mm were produced by a pan-type pelletizer. These pellets were used as foamable base material, and blended in such a manner that the foaming temperature thereof was 870° C.

The pettlet-like foamable inorganic raw materials were supplied on a continuous mesh belt to form a layer of 50 $cm$ × 50 $cm$ × 1 $cm$. A metal lath was embedded in the middle of the layer. The above ceramic paper was put on this base layer. The base layer with ceramic paper was carried into a kiln at a speed of 28 cm/min, and heated for 20 minutes at a maximum burning temperature of 870° C. to be fused and integrated. Then, the burned panel was quenched by four rolls each having a diameter of 160 mm. After being quenched, the panel was re-heated and fused for 5 minutes at 850° C., and gradually cooled. The burning was completed in 150 minutes after the base layer with ceramic paper was carried into the kiln. A temperature of the surface of the foamed panel after being quenched was 600° C., while that of the inner portion was 850° C.

The specific gravity, bending strength (based on JIS A 1408), smoothness, glossiness (based on JIS Z 8741), and wear-resistance (based on JIS A5209) of the obtained foamed ceramic panel were measured. The smoothness was measured with the help of a scanning electron microscope. The results are summarized in Table 1.

The shrinkage ratio of the ceramic paper measured by a caliper was 4%.

TABLE 1

| | Burning Temperature (°C.) | Specific Gravity | Bending* Strength (kg/cm²) | Smoothness | Glossiness* | Abrasion Loss* |
|---|---|---|---|---|---|---|
| Ex. 1 | 870 | 0.5 | 1 26.8 x = 27.0<br>2 27.0<br>3 27.2 | 20 μm> | 1 29.3 x = 30.2<br>2 30.2<br>3 31.1 | 1 0.02 x = 0.02<br>2 0.02<br>3 0.02 |
| Ex. 4 | 900 | 0.6 | 1 44.2 x = 44.8<br>2 45.3<br>3 44.8 | 20 μm> | 1 32.5 x = 33.3<br>2 34.0<br>3 33.5 | 1 0.02 x = 0.02<br>2 0.02<br>3 0.02 |
| Comp. Ex. 1 | 870 | 0.5 | 1 20.5 x = 21.3<br>2 21.2<br>3 22.1 | 0.4 mm> | 1 3.2 x = 2.8<br>2 2.5<br>3 2.7 | 1 0.10 x = 0.09<br>2 0.09<br>3 0.09 |
| Comp. Ex. 2 | 900 | 0.6 | 1 35.3 x = 36.9<br>2 37.4<br>3 37.9 | 0.4 mm> | 1 6.2 x = 6.0<br>2 6.0<br>3 5.8 | 1 0.08 x = 0.08<br>2 0.07<br>3 0.08 |

*With respect to bending stress, glossiness, and abrasion loss, three samples were measured and the average value was determined therefrom.

EXAMPLE 2

The procedure of Example 1 was repeated except that pulp fibers were used instead of almina fibers in the preparation of ceramic papers.

The shrinkage ratio of the obtained foamed ceramic panel was measured in the same manner as in Example 1 and found to be 50%.

EXAMPLE 3

The procedure of Example 1 was repeated except that the quenched foamed ceramic panel was not re-heated.

The glossiness of the obtained foamed ceramic panel was measured in the same manner as in Example 1 and found to be 7.1 (sample 1=6.2, sample 2=7.2, and sample 3=7.8).

COMPARATIVE EXAMPLE 1

The procedure of Example 1 was repeated except that a decorative or protective layer of 5 mm thick having the following proportion was laminated on the base layer instead of the ceramic paper and the foamed ceramic panel was not re-heated.

| Proportion of a decorative or protective layer* | |
| --- | --- |
| Acid clay | 71% |
| Soda ash | 10% |
| Soda nitrate | 4% |
| Zircon flower | 10% |
| Dolomite | 5% |
| Coloring agent M142 (Color Number) (available from Nitto Sangyo Kabushiki Kaisha) | 6% (a proportion to the total weight of the above five components) |
| Silica (Grain size: 200 mesh) | 4% (same as above) |

*Raw materials of the decorative or protective layer was prepared by mixing and grinding the above-mentioned components in a pot mill, and pelletizing the resultant grain.

The same items as in Example 1 were measured with respect to the obtained foamed ceramic panel. The results are summarized in Table 1.

EXAMPLE 4

A mixture consisting of 70% of fly ash 801 frit (available from Nitto Sangyo Kabushiki Kaisha), 10% of glass powder, 10% of water cullet, and 10% of feldspar was wet-grinded using a pot mill to obtain slips all of which pass through a sieve of 250 μm mesh. 5% of almina fibers (% is based on the total weight of the above blended raw materials), 5% of starch, 2% of acrylic emulsion, and anion or cation as a flocculant were added to the obtained slips. The liquid material is so prepared therefrom that the pulp concentration (a concentration of raw materials paper-made by a paper-making machine) is not more than 1%. The liquid material was fed to a paper-making machine to produce a sheet of 50 $cm$ × 50 $cm$ × 0.1 $cm$.

The finish was made on the surface of the obtained sheet by a roll at a pressure of 20 kg/cm². Then, the sheet was dried by FIR for two hours. After the drying, six kinds of pigments each of which was mixed with 201 cerazol and adjusted to fuse at 880° C. are directly printed on the ceramic paper respectively with a squeegee using six screens each of which corresponds to one kind of pigment. The patterned ceramic paper is obtained by drying the printed ceramic paper. The blending of the ceramic paper was so adjusted that the paper fuses at 880° C.

Next, a mixture consisting of 55% of obsidian, 20% of soda ash, 15% of bentonite, 5% of soda nitrate, and 5% of lime was dry-grinded by a pot mill to produce grinded material having a grain size of 44 μm/90% (not less than 90% by weight of grinded material pass through a sieve of 44 μm mesh). Thereafter, pellets having a grain diameter of 1 to 2 mm were produced by a pan-type pelletizer. These pellets were used as foaming base material, and blended in such a manner that the foaming temperature thereof was 900° C.

Foamed ceramic panels were produced in the same manner as in Example 1 except that the above ceramic paper and pellets were used instead of those in Example 1, and the burning maximum temperature and re-heating temperature after quenched were respectively 900° C. and 880° C.

The same items as in Example 1 were measured with respect to the obtained foamed ceramic panel. The results are summarized in Table 1.

EXAMPLE 5

The procedure of Example 1 was repeated except that the quenched foamed ceramic panel was not re-heated. The glossiness of the obtained foamed ceramic panel was measured in the same manner as in Example 1 and found to be 7.1 (sample 1=6.7, sample 2=7.2, and sample 3=7.5).

COMPARATIVE EXAMPLE 2

The procedure of Example 4 was repeated except that a decorative or protective layer of 5 mm thick having the following proportion was laminated on the base layer instead of the ceramic paper and the foamed ceramic panel was not re-heated. Raw materials of decorative or protective layer was prepared in the same manner as in Comparative Example 1.

| Proportion of a decorative or protective layer | |
| --- | --- |
| Feldspar | 69% |
| Soda ash | 12% |
| Soda nitrate | 4% |
| Zircon | 5% |
| Dolomite | 5% |

The same items as in Example 1 were measured with respect to the obtained foamed ceramic panel. The results are summarized in Table 1.

From Example 1 and Comparative Example 1, and Example 4 and Comparative Example 2, it can be understood that the bending strength, smoothness, the wear-resistance are improved and the glossiness is increased by laminating a ceramic paper on the surface of a base layer and fusing them together to be integrated with each other. In the case of using a decorative or protective layer (Comparative Examples 1 to 2), the obtained foamed ceramic panel is incapable of being printed thereon and has poor decoration. In the case of using a ceramic paper, on the other hand, the panel is capable of being multicolor printed with surprising clearness or sharpness and therefore is very decorative.

Further, results of Examples 1 to 2 show that the shrinkage ratio of cermic papers can be extremely restrained when using almina fibers as raw materials of ceramic papers.

Still further, results of Examples 1 and 3, and those of Examples 4 and 5 show that the re-heating of foamed ceramic panels after the quenching by rolls can sharply improve the glossiness of the surfaces of foamed ceramic panels.

What we claim is:

1. A foamed ceramic panel having a base layer comprising foamed inorganic raw materials, and a fine glass layer comprising fused and solidified ceramic paper and formed on at least one surface of the base layer, a layer of heat-foamable inorganic raw materials and the ceramic paper laminated on the surface of the layer of heat-foamable inorganic raw materials being sumultaneously burned and fused together.

2. The panel of claim 1, wherein the ceramic paper comprises inorganic powdery raw materials and at least one of almina fibers and mullite fibers.

3. The panel of claim 1, wherein the ceramic paper comprises inorganic powdery raw materials, inorganic fibers, and pulp fibers.

4. The panel of claim 1, wherein the ceramic paper further includes coloring materials.

5. The panel of claim 4, wherein the coloring material is a metal oxide.

6. The panel of claim 4, wherein the coloring material is a pigment.

7. The panel of claim 1, wherein an emboss pattern is given on the surface of the cermaic paper.

8. The panel of claim 1, wherein a pattern is printed on the surface of the ceramic paper with inorganic pigments.

9. A method of producing a foamed ceramic panel comprising laminating ceramic paper on at least one surface of a base layer comprising heat-foamable inorganic raw materials, burning the ceramic paper and base layer simultaneously to fuse together, quenching both surfaces of the foamed ceramic panel just after the fusing, and re-heating surface of the foamed ceramic panel to a softening temperature of the panel.

* * * * *